United States Patent
Lee et al.

(10) Patent No.: US 12,555,720 B2
(45) Date of Patent: Feb. 17, 2026

(54) MULTILAYER ELECTRONIC COMPONENT WITH ENHANCED ELECTRODE CONNECTIVITY USING Ni AND Al OXIDE

(71) Applicant: SAMSUNG ELECTRO-MECHANICS CO., LTD., Suwon-si (KR)

(72) Inventors: Gil Yong Lee, Suwon-si (KR); Su Ji Kang, Suwon-si (KR); Mun Seong Jeong, Suwon-si (KR); Jin Kyung Park, Suwon-si (KR); Chang Soo Jang, Suwon-si (KR); Sun Il Jeong, Suwon-si (KR); Hyun Jun Hwang, Suwon-si (KR); Jung Min Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 328 days.

(21) Appl. No.: 18/116,993

(22) Filed: Mar. 3, 2023

(65) Prior Publication Data

US 2024/0203644 A1    Jun. 20, 2024

(30) Foreign Application Priority Data

Dec. 14, 2022   (KR) .......................... 10-2022-0174884

(51) Int. Cl.
*H01G 4/008* (2006.01)
*H01G 4/012* (2006.01)
*H01G 4/30* (2006.01)

(52) U.S. Cl.
CPC ............. *H01G 4/008* (2013.01); *H01G 4/012* (2013.01); *H01G 4/30* (2013.01)

(58) Field of Classification Search
CPC .......... H01G 4/008; H01G 4/30; H01G 4/012; H01G 4/12; H01G 4/1209; H01G 4/1227; H01G 4/232
See application file for complete search history.

(56) References Cited

U.S. PATENT DOCUMENTS 9,236,185 B1 *   1/2016  Oguni ................. H01G 4/1227
2006/0198078 A1 * 9/2006  Miyauchi ............... H01G 4/008
                                                361/305

(Continued)

FOREIGN PATENT DOCUMENTS

| JP | 2010-103198 A | 5/2010 | |
| JP | 2014-232850 A | 12/2014 | |
| JP | 2017120871 A * | 7/2017 | ......... C04B 35/4682 |
| KR | 10-2020-0004020 A | 1/2020 | |
| WO | WO-2021210455 A1 * | 10/2021 | |

OTHER PUBLICATIONS

M Humenik, et al., Metal-Ceramic Interactions: III, Surface Tension and Wettability of Metal-Ceramic Systems, Journal of the American Ceramic Society, FIG. 1 and Table 3 (Year: 1954).*

(Continued)

*Primary Examiner* — Timothy J. Dole
*Assistant Examiner* — Daniel M Dubuisson
(74) *Attorney, Agent, or Firm* — Morgan, Lewis & Bockius LLP

(57) ABSTRACT

A multilayer electronic component includes a body including a dielectric layer and internal electrodes alternately disposed with the dielectric layer and external electrodes disposed on the body, wherein the internal electrodes include Ni and oxide including Al, and a content of Al is 3 at % or more and 5 at % or less compared to the Ni.

17 Claims, 6 Drawing Sheets

(56) References Cited

U.S. PATENT DOCUMENTS

| | | | | |
|---|---|---|---|---|
| 2012/0147516 A1* | 6/2012 | Kim | ................ | H01G 4/008 |
| | | | | 29/25.42 |
| 2013/0009515 A1* | 1/2013 | Kim | ................ | H01G 4/12 |
| | | | | 336/200 |
| 2013/0009516 A1* | 1/2013 | Kim | ................ | H01G 4/12 |
| | | | | 336/200 |
| 2013/0049532 A1* | 2/2013 | Kim | ................ | H01C 7/18 |
| | | | | 361/321.1 |
| 2013/0063862 A1* | 3/2013 | Kim | ................ | H01G 4/30 |
| | | | | 156/182 |
| 2014/0104748 A1* | 4/2014 | Park | ................ | H01G 4/01 |
| | | | | 156/89.12 |
| 2014/0240898 A1* | 8/2014 | Kim | ................ | H01G 4/012 |
| | | | | 156/89.12 |
| 2019/0304695 A1* | 10/2019 | Kim | ................ | H01G 4/30 |
| 2020/0013553 A1 | 1/2020 | Cha et al. | | |
| 2020/0043655 A1* | 2/2020 | Cha | ................ | H01G 4/012 |
| 2020/0058447 A1* | 2/2020 | Choe | ................ | H01G 4/1227 |
| 2021/0074479 A1* | 3/2021 | Lee | ................ | H01G 4/248 |

OTHER PUBLICATIONS

Ming-Jen Pan et al., IEEE Electrical Insulation Magazine (2010), A Brief Introduction to Ceramic Capacitors, May/June—vol. 26, No. 3.

Jeong-Oh Hong et al., Development History and Trend of High-Capacitance Multi-layer Ceramic Capacitor in Korea, Journal of the Korean Ceramic Society (2009), vol. 46, No. 2, pp. 161~169, (with English Abstract).

Samsung Electro-Mechanics, https://www.samsungsem.com/global/support/library/technical-documents/view.do?id=86.

Jiameng Zhang et al., Coating of Crystalline BaTiO3 Layer on Ni Nanoparticles for Multilayer Ceramic Capacitor Electrode, Advanced Engineering Materials, www.aem-journal.com, (2020).

Cheng Yang et al., Printed electrically conductive composites: conductive filler designs and surface engineering, Journal of Materials Chemistry C, 4052-4069 (2013).

Anton V. Polotai et al., Effect of Cr additions on the microstructural stability of Ni electrodes in ultra-thin BaTiO3 multilayer capacitors, J Electroceram (2007) 18:261-268.

* cited by examiner

MULTILAYER ELECTRONIC COMPONENT WITH ENHANCED ELECTRODE CONNECTIVITY USING Ni AND Al OXIDE

CROSS-REFERENCE TO RELATED APPLICATION

This application claims benefit of priority to Korean Patent Application No. 10-2022-0174884 filed on Dec. 14, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products, such as imaging devices including liquid crystal displays (LCDs) and plasma display panels (PDPs), computers, smartphones, cell phones, and the like, to allow electricity to be charged therein and discharged therefrom.

Currently, as miniaturization of electronic devices progresses, miniaturization and high integration of multilayer electronic components are also greatly required. In particular, in the case of multilayer ceramic capacitors as general-purpose electronic components, various attempts have been made to make multilayer ceramic capacitors thinner with higher capacity.

In order to achieve miniaturization and high capacitance of multilayer ceramic capacitors, there is a method of reducing the thickness of dielectric layers and internal electrodes. As the thickness of the internal electrodes is reduced, when a plurality of dielectric layers and a plurality of internal electrodes are fired, a problem in which the dielectric layers are formed to be thicker or a plurality of electrode disconnected regions occur may be intensified. When disconnected regions of the internal electrodes excessively occur, the connectivity of the internal electrodes may deteriorate, and thus, capacitance per unit volume of the multilayer ceramic capacitor may decrease. Therefore, there is a need to design an internal electrode structure capable of mitigating breakage of the internal electrodes while easily achieving miniaturization and high capacitance of the multilayer ceramic capacitor through thinning of the internal electrodes.

SUMMARY

An aspect of the present disclosure may provide a multilayer electronic component in which breakdown voltage (BDV) characteristics are improved, while improving capacitance per unit volume of the multilayer electronic component.

Another aspect of the present disclosure may provide a multilayer electronic component in which electrode connectivity of internal electrodes is secured.

Another aspect of the present disclosure may provide a multilayer electronic component in which a problem of difficulty in securing electrode connectivity when dielectric layers or internal electrodes are thinly formed in order to miniaturize the multilayer electronic component or increase capacitance of the multilayer electronic component is solved.

According to an aspect of the present disclosure, a multilayer electronic component includes a body including a dielectric layer and internal electrodes alternately disposed with the dielectric layer and external electrodes disposed on the body, wherein the internal electrodes include Ni and oxide including Al, and a content of the Al is 3 at % or more and 5 at % or less compared to a content of the Ni.

According to an aspect of the present disclosure, a multilayer electronic component includes a body including a dielectric layer and internal electrodes alternately disposed with the dielectric layer and external electrodes disposed on the body, wherein the internal electrodes include an oxide including Al, and an area of the oxide including Al is 0.5% or more and 1.0% or less of an area of at least one of the internal electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
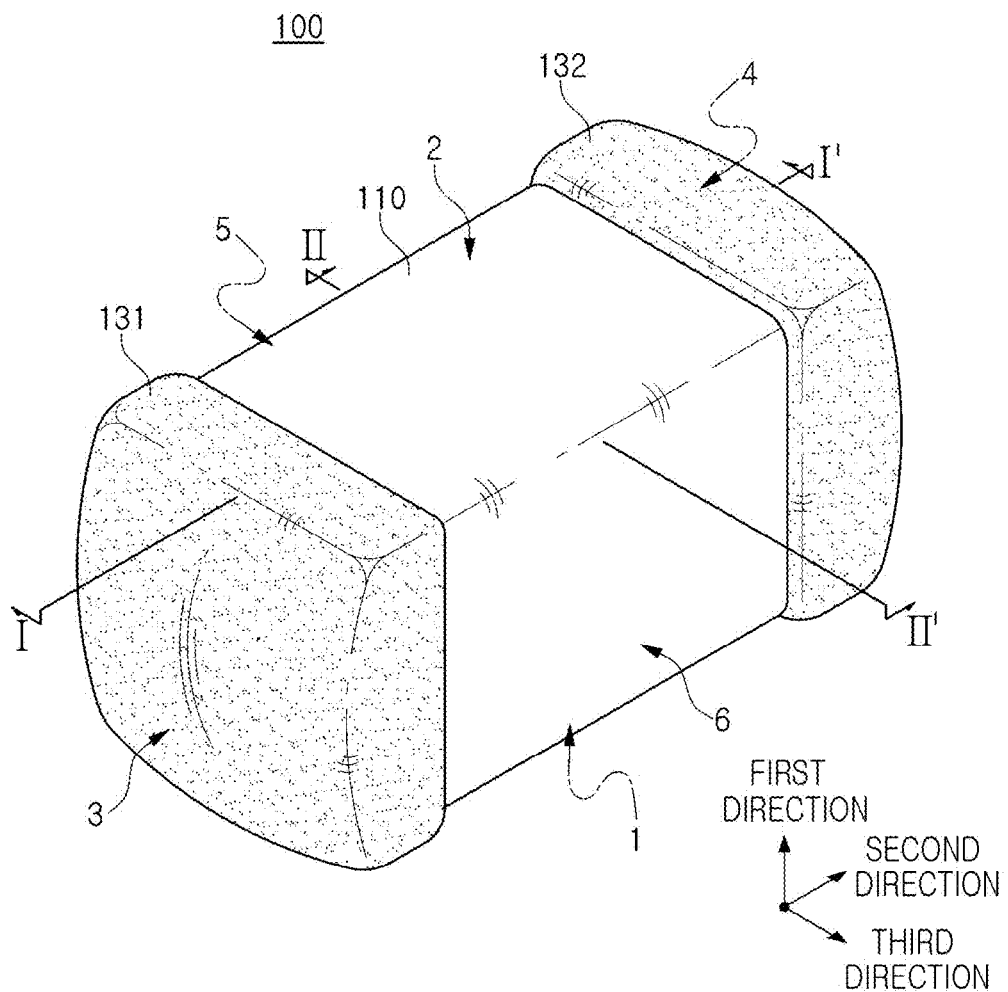
FIG. 1 is a perspective view schematically illustrating a multilayer electronic component that may be manufactured by a method of manufacturing a multilayer electronic component according to an exemplary embodiment in the present disclosure.

Exemplary embodiments of the present disclosure will now be described in detail with reference to the accompanying drawings.

In the drawings, a first direction is a direction in which first and second internal electrodes are alternately disposed with a dielectric layer interposed therebetween or a thickness (T) direction, and, among a second direction and a third direction perpendicular to the first direction, the second direction may be defined as a length (L) direction and the third direction may be defined as a width (W) direction.

FIG. 1 is a perspective view schematically illustrating a multilayer electronic component that may be manufactured by a method of manufacturing a multilayer electronic component according to an exemplary embodiment in the present disclosure.

Figure 2:
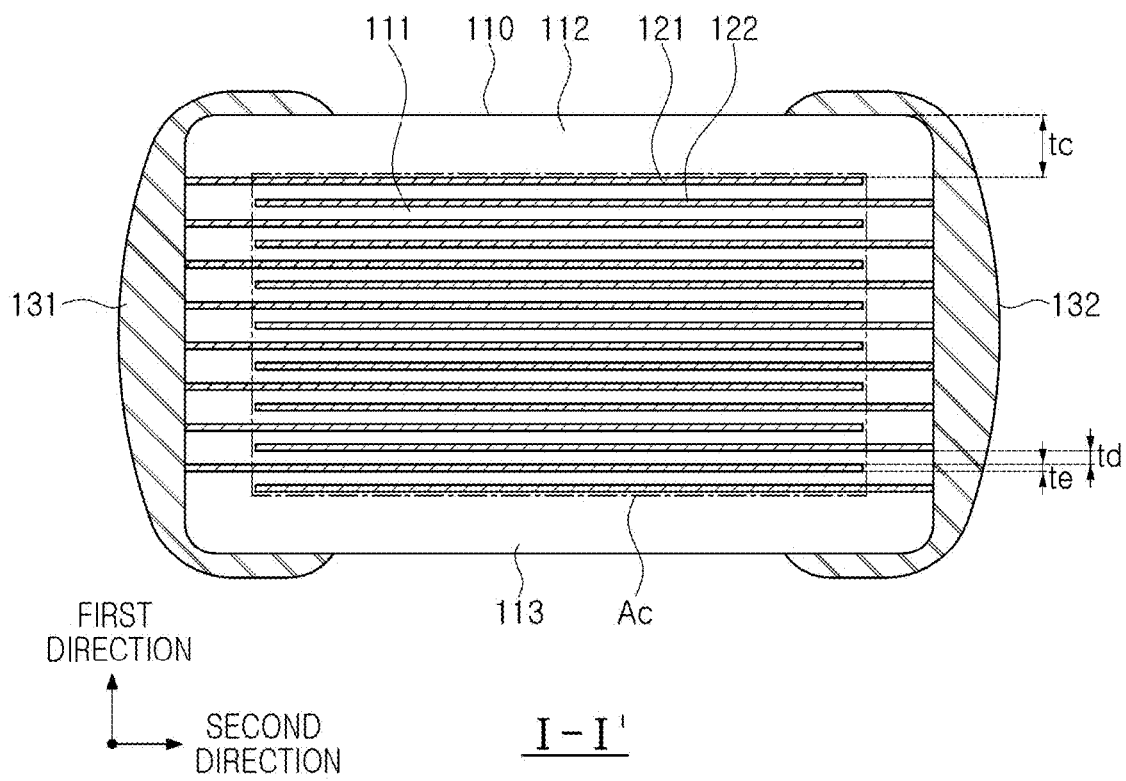
FIG. 2 is a cross-sectional view of FIG. 1, taken along line I-I'.

FIG. 2 is a cross-sectional view of FIG. 1, taken along line I-I'.

Figure 3:
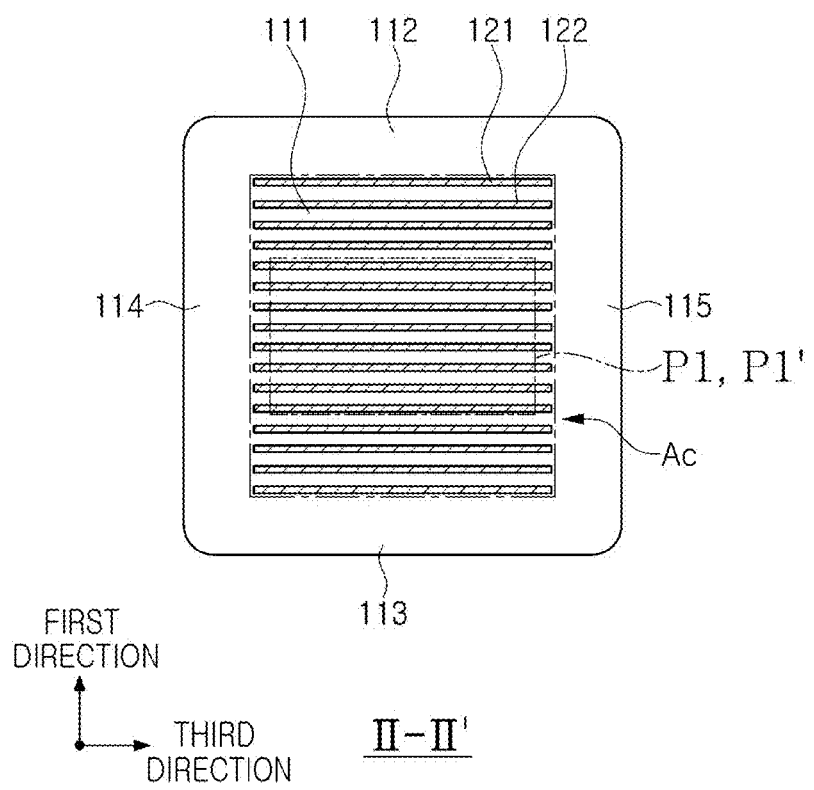
FIG. 3 is a cross-sectional view of FIG. 1, taken along line II-II'.

FIG. 3 is a cross-sectional view of FIG. 1, taken along line II-II'.

Figure 4:
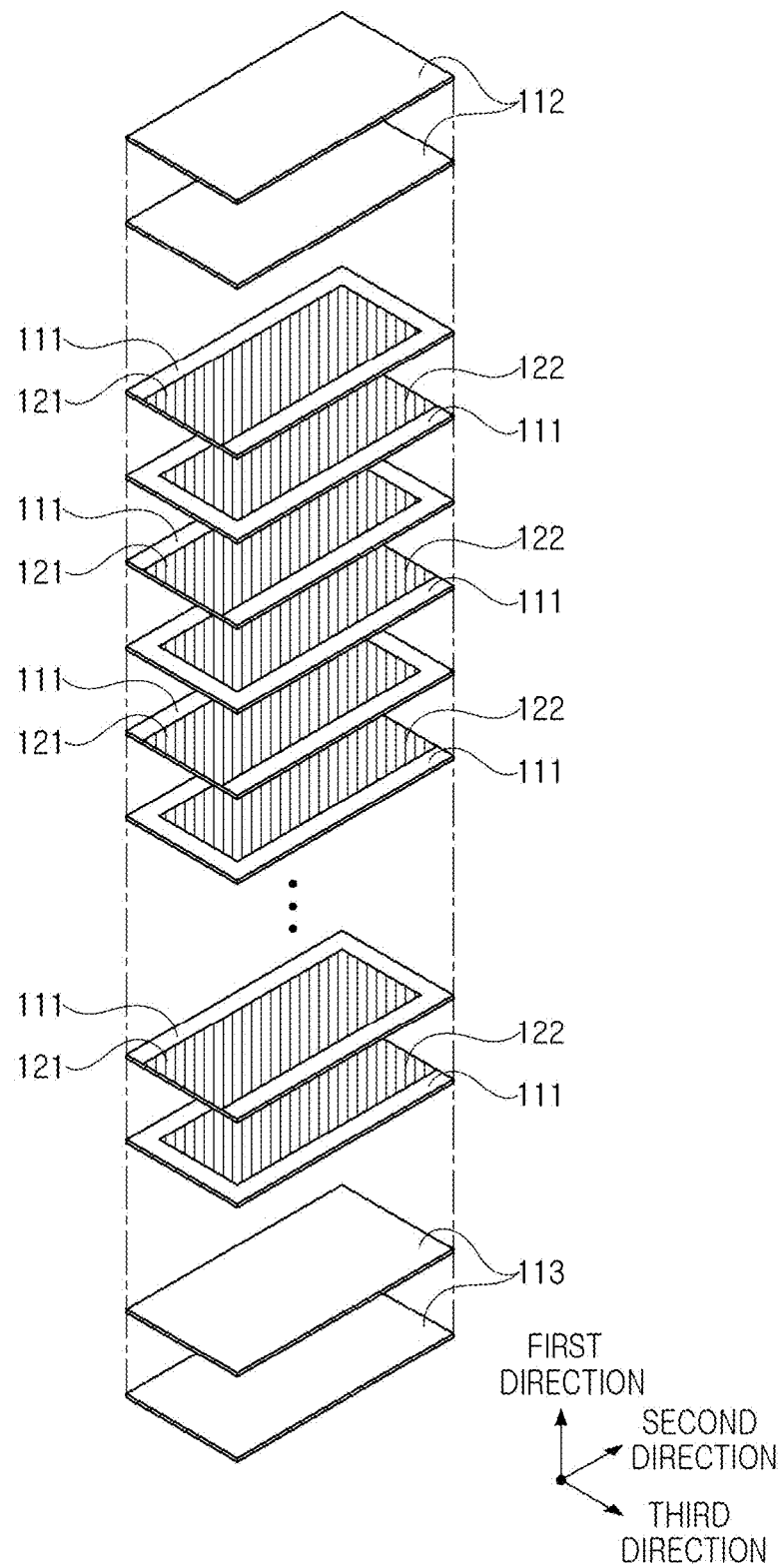
FIG. 4 is a view schematically illustrating a method of manufacturing a multilayer electronic component according to a comparative example.

FIG. 4 is a view schematically illustrating a method of manufacturing a multilayer electronic component according to a comparative example.

Figure 5:
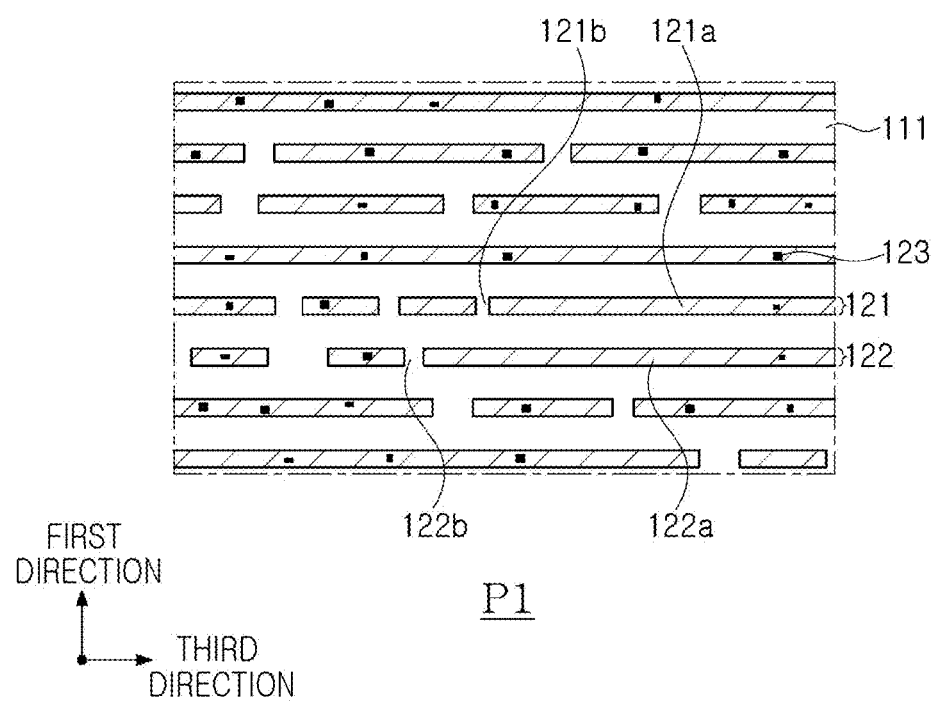
FIG. 5 is a schematic view of enlarged region P1 of FIG. 3.

FIG. 5 is a schematic view of enlarged region P1 of FIG. 3.

Hereinafter, a multilayer electronic component 100 according to an exemplary embodiment in the present disclosure will be described in detail with reference to FIGS. 1 to 5.

The multilayer electronic component 100 according to an exemplary embodiment in the present disclosure includes a body 110 including a dielectric layer 111 and internal alternately disposed with the electrodes 121 and 122 dielectric layer 111 and external electrodes 131 and 132 disposed on the body 110, wherein the internal electrodes 121 and 122 include Ni and oxide 123 including Al, and a content of Al is 3 at % or more and 5 at % or less compared to the Ni.

In the body 110, the dielectric layer 111 and the internal electrodes 121 and 122 are alternately disposed.

Although a specific shape of the body 110 is not particularly limited, as shown, the body 110 may have a hexahedral shape or a shape similar thereto. Due to the shrinkage of ceramic powder included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction. In this case, the first direction may be defined as a direction in which the dielectric layer 111 and the internal electrodes 121 and 122 are alternately disposed.

The plurality of dielectric layers 111 forming the body 110 are in a sintered state, and adjacent dielectric layers 111 may be integrated so that boundaries therebetween cannot be identified without using a scanning electron microscope (SEM).

According to an exemplary embodiment in the present disclosure, a material for forming the dielectric layer 111 is not limited as long as sufficient electrostatic capacitance may be obtained therewith. For example, a barium titanate-based material, a lead composite perovskite-based material, or a strontium titanate-based material may be used. The barium titanate-based material may include a $BaTiO_3$-based ceramic powder, and the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca, Zr, and the like are partially dissolved in $BaTiO_3$.

In addition, as a material for forming the dielectric layer 111, various ceramic additives, organic solvents, binders, dispersants, etc. may be added to the powder such as barium titanate ($BaTiO_3$) according to purposes of the present disclosure.

Meanwhile, an average thickness td of the dielectric layer 111 may not be particularly limited. For example, the average thickness td of the dielectric layer 111 may be 0.2 μm or more and 2 μm or less.

However, in general, if the dielectric layer is formed to be thin to have a thickness less than 0.6 μm, in particular, if the thickness of the dielectric layer is 0.35 μm or less, reliability of the multilayer electronic component 100 may be further deteriorated.

According to an exemplary embodiment in the present disclosure, the internal electrodes 121 and 122 may include Ni and the oxide 123 including Al, and the content of Al included in the internal electrode may be adjusted to be 3 at % or more to 5 at % or less, compared to Ni included in the internal electrode, so that the reliability of the multilayer electronic component 100 may be secured even when the average thickness td of the dielectric layer 111 is 0.35 μm or less. That is, when the average thickness td of the dielectric layer 111 is 0.35 μm or less, the reliability improvement effect according to the present disclosure may be more remarkable.

The average thickness td of the dielectric layer 111 may refer to an average thickness td of the dielectric layer 111 disposed between the first and second internal electrodes 121 and 122.

An average thickness of the dielectric layer 111 may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the capacitance forming portion Ac. In addition, if the average value is measured by extending the measurement of the average value to 10 dielectric layers, the average thickness of the dielectric layers may be more generalized. Other methods and/or tools appreciated by one of ordinary skill in the art, even if not described in the present disclosure, may also be used.

The body 110 may include the capacitance forming portion Ac formed inside the body 110 and forming capacitance by including the first internal electrode 121 and the second internal electrode 122 alternately disposed with the dielectric layer 111 interposed therebetween and cover portions 112 and 113 formed above and below the capacitance forming portion Ac in the first direction.

In addition, the capacitance forming portion Ac is a part that contributes to formation of capacitance of the capacitor, which may be formed by repeatedly stacking a plurality of first and second internal electrodes 121 and 122 with the dielectric layer 111 interposed therebetween The cover portions 112 and 113 may include an upper cover portion 112 disposed on one surface of the capacitance forming portion Ac in the first direction and a lower cover portion 113 disposed on the other surface of the capacitance forming portion Ac in the first direction.

The upper cover portion 112 and the lower cover portion 113 may be formed by stacking a single dielectric layer or two or greater dielectric layers on upper and lower surfaces of the capacitance forming portion Ac in the thickness direction, respectively, and may serve to basically prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 may not be particularly limited. However, an average thickness tc of the cover portions 112 and 113 may be 15 μm or less in order to more easily achieve miniaturization and high capacitance of the multilayer electronic component. In addition, according to an exemplary embodiment in the present disclosure, since the internal electrodes 121 and 122 include Ni and the oxide 123 including Al, and the content of Al included in the internal electrode is adjusted to 3 at % or more and 5 at % or less, compared to Ni included in the internal electrodes, the reliability of the multilayer electronic component 100 may be secured even when the average thickness tc of the cover portions is 15 μm or less.

The average thickness of the cover portions 112 and 113 may refer to a size in the first direction, and may be a value obtained by averaging sizes of the cover portions 112 and 113 in the first direction measured at five equally spaced points above or below the capacitance forming portion Ac in a scanning electron micrograph of a cross-section of the multilayer electronic component. Other methods and/or tools appreciated by one of ordinary skill in the art, even if not described in the present disclosure, may also be used.

In addition, margin portions 114 and 115 may be disposed on side surfaces of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the body 110 in the third direction (width direction).

As shown in FIG. 3, the margin portions 114 and 115 may refer to a region between both ends of the first and second internal electrodes 121 and 122 and a boundary surface of the body 110 in a cross-section cut in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or greater dielectric layers on both side surfaces of the capacitance forming portion Ac in the third direction (the width direction).

Meanwhile, the widths of the margins 114 and 115 may not be particularly limited. However, an average width of the margin portions 114 and 115 may be 15 μm or less in order to more easily achieve miniaturization and high capacitance of the multilayer electronic component. In addition, according to an exemplary embodiment in the present disclosure, since the internal electrodes 121 and 122 include Ni and the oxide 123 including Al and the content of Al included in the internal electrode is adjusted to 3 at % or more and 5 at % or less, compared to Ni included in the internal electrodes, the reliability of the multilayer electronic component 100 may be secured even when the average width of the margin portions 114 and 115 is 15 μm or less.

The average width of the margin portions 114 and 115 may refer to an average size of the margin portions 114 and 115 in the third direction, and may be a value obtained by averaging sizes of the margin portions 114 and 115 in the third direction measured at five equally spaced points on the side surface of the capacitance forming portion Ac in a scanning electron micrograph of a cross-section of the multilayer electronic component. Other methods and/or tools appreciated by one of ordinary skill in the art, even if not described in the present disclosure, may also be used.

The internal electrodes 121 and 122 may be alternately disposed with the dielectric layer 111 in the first direction.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be connected to the third and fourth surfaces 3 and 4 of the body 110, respectively. Specifically, one end of the first internal electrode 121 may be connected to the third surface, and one end of the second internal electrode 122 may be connected to the fourth surface.

The first internal electrode 121 may be spaced apart from the fourth surface 4 and may be exposed to the third surface 3, and the second internal electrode 122 may be spaced apart from the third surface 3 and may be exposed to the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 is not connected to the second external electrode 132 but is connected to the first external electrode 131, and the second internal electrode 122 is not connected to the first external electrode 131 but connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

Meanwhile, when the internal electrodes 121 and 122 include nickel (Ni), as the nickel (Ni) particles are atomized, a phenomenon in which breakdown voltage (BDV) is lowered may become more problematic. According to an exemplary embodiment in the present disclosure, since the internal electrodes 121 and 122 include Ni and the oxide 123 including Al, and the content of Al included in the internal electrode is adjusted to 3 at % or more and 5 at % or less, compared to Ni included in the internal electrodes, the reliability of the multilayer electronic component 100 may be improved even when the internal electrodes 121 and 122 include nickel (Ni). That is, when the internal electrodes 121 and 122 include nickel (Ni), the reliability improvement effect according to the present disclosure may be more remarkable.

In addition, an average thickness te of the internal electrodes 121 and 122 may not be particularly limited. For example, the average thickness te of the internal electrodes 121 and 122 may be 0.2 µm or more and 2 µm or less.

However, in general, in a case in which the internal electrodes are formed to be thin to have a thickness less than 0.6 µm, in particular, if the thickness of the internal electrodes is 0.35 µm or less, the reliability of the multilayer electronic component 100 may be more problematic.

According to an exemplary embodiment in the present disclosure, since the internal electrodes 121 and 122 include Ni and the oxide 123 including Al, and the content of Al included in the internal electrode is adjusted to 3 at % or more and 5 at % or less, compared to Ni included in the internal electrodes, the reliability may be improved even when the average thickness te of the internal electrodes 121 and 122 is 0.35 µm or less.

Therefore, when the thickness of the internal electrodes 121 and 122 is 0.35 µm or less, the effect according to the present disclosure may be more remarkable and miniaturization and high capacitance of the ceramic electronic component may be more easily achieved.

The average thickness te of the internal electrodes 121 and 122 may refer to an average thickness te of the internal electrodes 121 and 122.

The average thickness te of the internal electrodes 121 and 122 may be measured by scanning an image of a cross-section of the body 110 in the length-thickness (L-T) direction with a scanning electron microscope (SEM) having a magnification of 10,000. More specifically, the average value may be measured by measuring the thickness of one internal electrode at 30 equally spaced points in a longitudinal direction in the scanned image. The 30 points at equal intervals may be designated in the capacitance forming portion Ac. In addition, if the average value is measured by extending the measurement of the average value to 10 internal electrodes, the average thickness of the internal electrodes may be more generalized. Other methods and/or tools appreciated by one of ordinary skill in the art, even if not described in the present disclosure, may also be used.

The external electrodes 131 and 132 may be disposed on the third surface 3 and the fourth surface 4 of the body 110. The external electrodes 131 and 132 may include first and second external electrodes 131 and 132 respectively disposed on the third and fourth surfaces 3 and 4 of the body 110 and connected to the first and second internal electrodes 121 and 122, respectively.

In the present exemplary embodiment, a structure in which the multilayer electronic component 100 has two external electrodes 131 and 132 is described, but the number and shape of the external electrodes 131 and 132 depend on the shape of the internal electrodes 121 and 122 or other purposes.

Meanwhile, the external electrodes 131 and 132 may be formed using any material having electrical conductivity, such as metal, and a specific material may be determined in consideration of electrical characteristics, structural stability, and the like, or may have a multilayer structure.

For example, the external electrodes 131 and 132 may include an electrode layer disposed on the body 110 and a plating layer formed on the electrode layer.

As a more specific example of the electrode layer, the electrode layer may be a fired electrode including a conductive metal and glass or a resin-based electrode including a conductive metal and resin.

In addition, the electrode layer may have a form in which a fired electrode and a resin-based electrode are sequentially formed on the body. Also, the electrode layer may be formed by transferring a sheet including a conductive metal onto the body or by transferring a sheet including a conductive metal onto a fired electrode.

As the conductive metal included in the electrode layer, a material having excellent electrical conductivity may be used and is not particularly limited. For example, the conductive metal may be at least one of nickel (Ni), copper (Cu), and alloys thereof.

The plating layer serves to improve mounting characteristics. The type of the plating layer is not particularly limited and may be a plating layer including at least one of Ni, Sn, Pd, and alloys thereof, and may be formed of a plurality of layers.

For a more specific example of the plating layer, the plating layer may be a Ni plating layer or a Sn plating layer, may be a form in which a Ni plating layer and a Sn plating layer are sequentially formed on the electrode layer, and a form in which a Sn plating layer, a Ni plating layer, and a Sn plating layer are sequentially formed. Further, the plating layer may include a plurality of Ni plating layers and/or a plurality of Sn plating layers.

The size of the multilayer electronic component 100 may not be particularly limited.

However, in order to achieve miniaturization and high capacitance at the same time, the thickness of the dielectric layer and the internal electrode needs be reduced to increase the number of layers, and therefore, the effect of improving adhesion strength according to the present disclosure may be more remarkable in the multilayer electronic component 100 having a size of 0603 (length×width, 0.6 mm×0.3 mm) or less.

Accordingly, when the multilayer electronic component 100 has a length of 0.66 mm or less and a width of 0.33 mm or less, considering manufacturing errors, the size of the external electrode, etc., adhesion strength improvement effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

According to an exemplary embodiment in the present disclosure, the oxide 123 including Al may be included in the internal electrode including Ni. When a conductive material forming the internal electrodes 121 and 122 is atomized to reduce the thickness and size of the multilayer electronic component 100, a problem of deterioration of connectivity of the internal electrodes after firing may occur.

For example, when Ni particles are atomized before firing the internal electrode, a melting point and a thermal contraction onset temperature may be reduced, so excessive thermal contraction and aggregation may occur during firing. In addition, as a difference between a melting point and a thermal contraction initiation temperature of ceramic particles included in the dielectric layer and a melting point and a thermal contraction initiation temperature of Ni particles included in the internal electrode increases, sintering mismatch between the dielectric layer and the internal electrode may increase. The sintering mismatch between the dielectric layer and the internal electrode may cause accelerated deterioration of connectivity of the internal electrodes. Therefore, in the present disclosure, in order to improve connectivity of the internal electrodes by overcoming the sintering mismatch between the dielectric layer and the internal electrodes, the oxide 123 including Al, which is a non-reducing material having a melting point higher than a ceramic material of the dielectric layer and does not deteriorate the characteristics of the internal electrodes even when fired in a reducing atmosphere, is included the internal electrodes 121 and 122 including Ni, and the content of Al compared to Ni is adjusted to overcome the aforementioned sintering mismatch between the dielectric layer and the internal electrode and improve connectivity of the internal electrodes 121 and 122.

A melting point of Ni included in the internal electrodes 121 and 122 is 1455° C., and a melting point of $BaTiO_3$ that may be included in the dielectric layer 111 corresponds to 1625° C. That is, a difference may occur between the sintering start point of the internal electrodes 121 and 122 and the sintering start temperature of the dielectric layer 111, and the difference between the sintering start temperature may be 500° C. or more. A melting point (2072° C.) of $Al_2O_3$ (alumina), which is an example of the oxide 123 including Al, is higher than the melting point of Ni (1455° C.) and the melting point of $BaTiO_3$ (1625° C.), which may be a main component of the dielectric layer. In addition, when the oxide 123 including Al is included in the internal electrodes 121 and 122 including Ni, preferably, when the oxide 123 including Al is trapped and disposed in the internal electrodes 121 and 122 including Ni, steric hindrance may occur between the Ni particles of the internal electrodes. Therefore, when the oxide 123 including Al is included in the internal electrodes 121 and 122 including Ni, the difference between the sintering start temperature of the internal electrodes 121 and 122 and the sintering start temperature of the dielectric layer 111 may be alleviated and thermal contraction of the internal electrodes 121 and 122 may be delayed. According to an exemplary embodiment in the present disclosure, since the internal electrodes 121 and 122 include Ni and the oxide 123 including Al, when the difference between the sintering start temperatures of the internal electrodes 121 and 122 and the dielectric layer 111 is alleviated and the thermal contraction of the internal electrodes 121 and 122 is delayed, the connectivity of the internal electrodes 121 and 122 may be improved, and therefore, capacitance per unit volume and the BDV characteristics of the multilayer electronic component 100 may be improved.

According to an exemplary embodiment in the present disclosure, the content of the oxide 123 including Al included in the internal electrodes 121 and 122 is 3 at % or more compared to Ni included in the internal electrodes 121 and 122. If the content of the oxide 123 including Al included in the internal electrodes 121 and 122 is less than 3 at % compared to Ni included in the internal electrodes 121 and 122, the amount of the oxide 123 including Al trapped in the internal electrodes 121 and 122 is so small that sufficient connectivity may not be secured and it may be difficult to sufficiently improve the capacitance per unit volume although the BDV characteristics of the multilayer electronic component 100 is improved. In an exemplary embodiment in the present disclosure, by adjusting the content of the oxide 123 including Al included in the internal electrodes 121 and 122 to 3 at % or more compared to Ni included in the internal electrodes 121 and 122, the conductivity of the internal electrodes 121 and 122 may be sufficiently secured, thereby significantly improving the BDV characteristics of the multilayer electronic component 100 and simultaneously improving capacitance per unit volume.

According to an exemplary embodiment in the present disclosure, the content of the oxide 123 including Al included in the internal electrodes 121 and 122 is 5 at % or less compared to Ni included in the internal electrodes 121 and 122. If the content of the oxide 123 including Al included in the internal electrodes 121 and 122 exceeds 5 at % compared to the Ni included in the internal electrodes 121 and 122, a problem in which the oxide 123 including Al excessively squeezes out to t the interface between the internal electrodes 121 and 122 and the dielectric layer 111 may arise. Accordingly, even if the connectivity of the internal electrodes 121 and 122 is improved, the capacitance per unit volume of the multilayer electronic component 100 may decrease and the effect of improving BDV characteristics may also decrease. In an exemplary embodiment in the present disclosure, by adjusting the content of the oxide 123 including Al included in the internal electrodes 121 and 122 to 5 at % or less compared to Ni included in the internal electrodes 121 and 122, the connectivity of the internal electrodes 121 and 122 may be sufficiently secured to significantly improve the BDV characteristics of the multilayer electronic component 100 and improve the capacitance per unit volume, and by suppressing the phenomenon in which the oxide 123 including Al excessively squeezes out to the interface between the internal electrodes 121 and 122 and the dielectric layer 111, a phenomenon in which deterioration of the capacitance per unit volume of the multilayer electronic component 100 and deterioration of the BDV characteristic improvement effect may be prevented.

A method of measuring the content of Al compared to Ni in the internal electrodes 121 and 122 is not particularly limited. As an example, in cross-sections in the first and third directions cut at a central portion of the multilayer electronic component 100 in the second direction, at % of each element may be measured through transmission electron microscopy-energy dispersive spectroscopy (TEM-EDS) analysis in the internal electrodes 121 and 122, and the content of Al compared to Ni in the internal electrodes 121 and 122 may be measured by converting the at % of each element into at % of Al compared to Ni (e.g., the content of Ni may be set to 100 at %). Specifically, after locating a point at which Al signal difference occurs in the center of an image through TEM-EDS mapping, the content of Al compared to Ni in the internal electrodes 121 and 122 may be measured through point EDS at a high magnification where a scale bar of the image is 50 nm or less. The content of Ni element of the internal electrode may be an average value measured at 10 or more points other than a point at which the Al signal difference occurs, and the content of Al element may be an average value measured from 3 or more points among the region in which the Al signal difference occurs. If this measurement is performed on five or more internal electrodes of the capacitance forming portion Ac and an average value is taken, the content of Al compared to Ni in the internal electrodes 121 and 122 may be further generalized. Other methods and/or tools appreciated by one of ordinary skill in the art, even if not described in the present disclosure, may also be used.

Meanwhile, as an example for improving the electrode connectivity, capacitance per unit volume, and BDV characteristics of the internal electrodes 121 and 122 of the multilayer electronic component 100, there is a method of adjusting an area of the oxide 123 including Al included in the internal electrodes 121 and 122. According to an exemplary embodiment, the area of the oxide 123 including Al may be 0.5% or more and 1.0% or less of the area of the internal electrodes 121 and 122.

If the area of the oxide 123 including Al is less than 0.5% compared to the area of the internal electrodes 121 and 122, the connectivity of the internal electrodes 121 and 122 may not be sufficiently secured, so that it may be difficult to sufficiently improve the capacitance per unit volume even though the BDV characteristics of the multilayer electronic component 100 are improved.

If the area of the oxide 123 including Al exceeds 1.0% of the area of the internal electrodes 121 and 122, a problem in that the oxide 123 including Al excessively squeezes out to the interface between the internal electrodes 121 and 122 and the dielectric layer 111 may arise. Accordingly, even if the connectivity of the internal electrodes 121 and 122 is improved, the capacitance per unit volume of the multilayer electronic component 100 may decrease and the effect of improving BDV characteristics may also decrease.

Therefore, according to an exemplary embodiment in the present disclosure, the area of the oxide 123 including Al is adjusted to 0.5% or more and 1.0% or less compared to the area of the internal electrodes 121 and 122, so that the connectivity of the internal electrodes 121 and 122, capacitance per unit volume, and BDV characteristics of the multilayer electronic component 100 may be improved.

A method of measuring the area of the oxide 123 including Al compared to the area of the internal electrodes 121 and 122 is not particularly limited. As an example, the area of the oxide 123 including Al compared to the area of the internal electrodes 121 and 122 may be measured by measuring an area of a region in which a mapping signal of Al is high (e.g., higher than Ni) and measuring an area of a region in which an Ni mapping signal is high (e.g., higher than Al) through transmission electron microscopy-energy dispersive spectroscopy (TEM-EDS) analysis, and then calculating a ratio thereof in the cross-sections cut in the first direction and third direction at the central portion of the multilayer electronic component 100 in the second direction. Specifically, the area of the oxide 123 including Al compared to the area of the internal electrodes 121 and 122 may be measured through EDS mapping analysis at a magnification in which one layer of the internal electrodes 121 and 122 occupies 50% or more of the entire image. The area of the region with a high Ni element mapping signal is measured as the area of the internal electrodes 121 and 122, and the area of the region with a high Al element mapping signal is measured as the area of the oxide 123 including Al, and the ratio thereof may be calculated to measure the area of the oxide 123 including Al compared to the area of the internal electrodes 121 and 122. If this measurement is performed on five or more internal electrodes of the capacitance forming portion Ac and an average value is taken, the value of the area of the oxide 123 including Al compared to the area of the internal electrodes 121 and 122 may be further generalized. Other methods and/or tools appreciated by one of ordinary skill in the art, even if not described in the present disclosure, may also be used.

Figure 6:
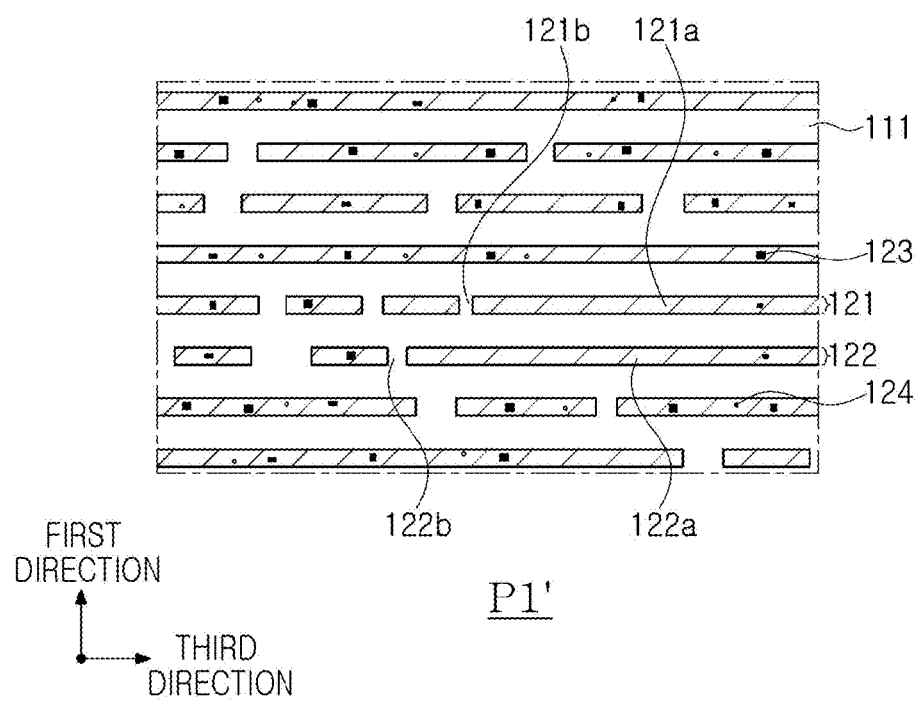
FIG. 6 is a schematic view of enlarged region P1' of FIG. 3.

FIG. 6 is a schematic view of enlarged region P1' of FIG. 3.

Referring to FIG. 6, in an exemplary embodiment, the internal electrodes 121 and 122 may further include ceramic particles 124 including Ba and Ti. When a certain amount or more of ceramic particles 124 including Ba and Ti is added to the internal electrodes 121 and 122, there may be ceramic particles 124 including Ba and Ti that cannot squeeze out from the internal electrodes during firing. That is, the ceramic particles 124 including Ba and Ti may be trapped inside the internal electrodes 121 and 122. The ceramic particles 124 including Ba and Ti trapped in the internal electrodes 121 and 122 may serve to move a sintering start temperature of the Ni particles to a high temperature to be adjacent to a sintering start temperature of the dielectric layer 111 during sintering of the internal electrodes 121 and 122. Meanwhile, as the internal electrodes 121 and 122 become thinner, the content of the ceramic particles 124 including Ba and Ti may increase in order to obtain an appropriate sintering start temperature. If the content of the ceramic particles 124 including Ba and Ti in the internal electrodes 121 and 122 excessively increases, the ceramic particles 124 including Ba and Ti may escape to the dielectric layer 111 during sintering and firing to increase the thickness of the dielectric layer 111 to cause a problem of lowering a dielectric constant, and lower an Ni filling rate of the internal electrodes 121 and 122 to cause a problem of degrading electrode connectivity. According to an exemplary embodiment in the present disclosure, the internal electrodes 121 and 122 include Ni and an oxide 123 including Al, and the content of Al included in the internal electrodes 121 and 122 is adjusted to 3 at % or more and 5 at % compared to Ni, so that even when the internal electrodes 121 and 122 further include the ceramic particles 124 including Ba and Ti, the sintering start temperature of the internal electrodes 121 and 122 may be moved to a high temperature, thinning of the internal electrodes 121 and 122 may be easily achieved, and the connectivity of the internal electrodes 121 and 122 may be improved, even if the ceramic particles 124 including Ba and Ti are not excessively used.

Referring to FIGS. 5 and 6, in an exemplary embodiment, the internal electrodes 121 and 122 include two or more electrode regions 121a and 122a including a conductive material and includes disconnected regions 121b and 122b which are a space between the electrode regions 121a and 122a, and when a ratio of the sum of the lengths of the electrode regions 121a and 122a to a total length of the internal electrodes is electrode connectivity, the electrode connectivity may be 81% or more. When the internal electrodes 121 and 122 are formed by firing, metal particles inside the internal electrodes 121 and 122 may locally aggregate to form voids, and these voids may break as the firing progresses to cause deterioration of the connectivity of the internal electrode. That is, the disconnected regions 121b and 122b may be formed in the internal electrodes 121 and 122. The disconnected regions 121b and 122b may include a dielectric or a void derived from the dielectric layer 111. That is, according to an exemplary embodiment, although the internal electrodes 121 and 122 may include two or more electrode regions 121a and 122a including a conductive material and may include the disconnected regions 121b and 122b which are a space between the electrode regions 121a and 122a, since the internal electrodes 121 and 122 include Ni and include the oxide 123 including Al and the content of Al included in the internal electrodes 121 and 122 is adjusted to 3 at % or more to 5 at % compared to Ni, the connectivity of the internal electrode may be improved to 81% or more. Accordingly, the capacitance per unit volume and BDV characteristics of the multilayer electronic component 100 may be improved. The electrode connectivity may be measured by the method disclosed in connected with the Example herein. Other methods and/or tools appreciated by one of ordinary skill in the art, even if not described in the present disclosure, may also be used.

In an exemplary embodiment, when a region up to 20 nm in the inner direction of the internal electrodes 121 and 122 from the interface between the internal electrodes 121 and 122 and the dielectric layer 111 is a surface portion and a region disposed between the surface portions is a central portion, the content of Al compared to Ni included in the internal electrode may be higher in the central portion than in the surface portion.

The internal electrodes 121 and 122 may form interfaces contacting the dielectric layer 111. In this case, the interface between the internal electrode and the dielectric layer may be defined as a point at which the Ni content converges to 0.5 at % or less.

In addition, a surface portion extending up to 20 nm in the inner direction of the internal electrodes 121 and 122 and a central portion disposed between the surface portions may be included.

The surface portion is a region adjacent to the interface between the internal electrodes 121 and 122 and the dielectric layer 111, and when oxide including Al is excessively distributed in the surface portion, Al or the oxide including Al may diffuse or escape excessively to the interface between the internal electrodes 121 and 122 and the dielectric layer 111. In this case, a problem in which permittivity of the dielectric layer 111 is lowered may occur, which may resultantly cause the capacitance per unit volume of the multilayer electronic component 100 to be lowered. Therefore, in an exemplary embodiment, the content of Al compared to Ni included in the internal electrodes 121 and 122 is adjusted to be higher in the central portion than in the surface portion to alleviate the decrease in permittivity of the dielectric layer 111.

From a similar point of view, it is preferable that the area of the oxide including Al compared to the area of the internal electrode is wider in the central portion than in the surface portion.

Example

Table 1 shows evaluation by comparing the content of Al compared to Ni included in the internal electrodes, the electrode connectivity according to the area of the oxide including Al compared to the area of the internal electrodes, the capacitance per unit volume, and BDV characteristics in the multilayer electronic component 100 according to an exemplary embodiment in the present disclosure.

In the results of Table 1, the relative values for each test number are described based on a value of Test No. 1 in which the area of the oxide including Al compared to the area of the internal electrodes is 0 (the content of Al compared to Ni is 0.5 at %) is 1, and the multilayer electronic components corresponding to all test numbers have substantially the same configuration except for the area of the oxide including Al and the content of Al compared to Ni.

The area ratio of a secondary phase in Table 1 is a ratio (%) of the area of the oxide 123 including Al to the area of the internal electrodes 121 and 122, and was measured by measuring an area of a region in which a mapping signal of Al was high and measuring an area of a region in which an Ni mapping signal was high through transmission electron microscopy-energy dispersive spectroscopy (TEM-EDS) analysis, and then calculating a ratio thereof in the cross-sections cut in the first direction and third direction at the central portion of the multilayer electronic component 100 in the second direction. Specifically, in an image in which one layer of the internal electrodes 121 and 122 occupies 50% or more of the entire image, an area of a region in which the signal of the Ni element is high is determined as the area of the internal electrodes 121 and 122 and an area of a region in which the signal of the Al element is high is determined as the area of the oxide 123 including Al, and then, the ratio of the area of the oxide 123 including Al compared to the area of the internal electrodes 121 and 122 was measured. The measurement was performed on five or more internal electrodes 121 and 122 of the capacitance forming portion Ac, and an average value was obtained.

For the content ratio (at %) of Al compared to Ni included in the internal electrodes, at % of each element of the internal electrodes 121 and 122 was measured through TEM-EDS analysis in the cross-sections in the first and third directions cut at the central portion of the multilayer electronic component 100 in the second direction, which was converted into at % of Al compared to Ni. Specifically, after locating the point at which the Al signal difference occurred in a central portion of the image through TEM-EDS mapping, it was measured through point EDS at a high magnification at which a scale bar of the image was 50 nm or less. For the content of Ni element of the internal electrodes, an average value measured at 10 or more points other than the point at which the Al signal difference occurred was obtained, and for the content of Al element, an average value measured at 3 or more points among the regions in which the Al signal difference occurred.

For electrode connectivity, 50 samples were tested per test number. Cross-sections of the multilayer electronic component 100 in the first direction and the third direction were polished to a central portion in the second direction, and then electrode connectivity was measured from an image in which each of a central portion of the capacitance forming portion Ac and regions (9.2 μm×5.4 μm) on both sides of the central portion in the third direction was observed with an microscope (OM) of 200 magnification, and an average value was calculated. Specifically, when a region of the internal electrode including the conductive material is an electrode region and a space between the electrode regions is a disconnected region, the ratio of the sum of the lengths of the electrode regions compared to the total length of the internal electrodes was measured.

The capacitance per unit volume was the average of the capacitance values measured from 50 samples per test number, and was measured with an LCR meter (Kesight E4980A) under 1 kHz 0.5V (AC). All of the measurement samples were subjected to measurement after heat treatment at 150° ° C. for 1 hour and aging at room temperature for 2 hours.

The dielectric breakdown voltage was measured for 50 samples and an average value was calculated, and a voltage when an insulation resistance (IR) value fell below 10000Ω under a 100V/s boost condition was measured as a breakdown voltage.

TABLE 1

| Test No. | Area ratio of secondary phase (%) | Content of Al compared to Ni (at %) | Electrode connectivity | Capacitance per unit volume | Breakdown voltage |
|---|---|---|---|---|---|
| 1 | 0.0 | 0.5 | 1 | 1 | 1 |
| 2 | 0.3 | 1 | 1.01 | 1 | 1.08 |
| 3 | 0.5 | 3 | 1.04 | 1.01 | 1.35 |
| 4 | 1.0 | 5 | 1.05 | 1.02 | 1.52 |
| 5 | 1.5 | 7 | 1.06 | 0.97 | 1.12 |

Test No. 1 is a case in which the area of the oxide including Al compared to the area of the internal electrode is 0 (the content of Al compared to Ni is 0.5 at %), and the electrode connectivity, capacitance per unit volume, and breakdown voltage at this time are set to 1, based on which evaluation was made.

Test Nos. 1 and 2 are cases in which the content of Al compared to Ni is less than 3 at % (area ratio of the secondary phase is less than 0.5%), and it can be seen that the effect of improving the capacitance per unit volume is insufficient even though the electrode connectivity and BDV characteristics are improved.

Test Nos. 3 and 4 are cases in which the content of Al compared to Ni is 3 at % or more and 5 at % or less (the area ratio of the secondary phase is 0.5% or more and 1.0% or less), and it can be seen that the electrode connectivity and BDV characteristics are excellent, and the capacitance per unit volume is improved.

Test No. 5 is a case in which the content of Al compared to Ni exceeds 5 at % (the area ratio of the secondary phase exceeds 1.0%), and it can be seen that, although the electrode connectivity is improved, the effect of improving the BDV characteristics is reduced and the capacitance per unit volume is reduced.

Therefore, as in the exemplary embodiment in the present disclosure, it can be seen that, when the internal electrode includes Ni and includes oxide including Al, and the content of Al compared to Ni included in the internal electrode is 3 at % or more and 5 at % or less (the area ratio of the secondary phase is 0.5% or more and 1.0% or less), the capacitance per unit volume may be improved, while improving the electrode connectivity and BDV characteristics.

One of the various effects of the present disclosure is to improve the capacitance per unit volume and to improve the BDV characteristics of the multilayer electronic component.

One of the various effects of the present disclosure is to improve electrode connectivity of the internal electrodes.

One of the various effects of the present disclosure is to improve the reliability of multilayer electronic components even when dielectric layers or internal electrodes are formed thin to increase capacitance of multilayer electronic component and reducing the size of the multilayer electronic component.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including a dielectric layer and internal electrodes alternately disposed with the dielectric layer; and
    external electrodes disposed on the body,
    wherein the internal electrodes include Ni and an oxide including Al,
    a content of the Al is 3 at % or more and 5 at % or less compared to a content of the Ni,
    wherein at least one of the internal electrodes includes:
        a surface portion that is a region from an interface between the at least one of the internal electrodes and the dielectric layer up to 20 nm inside the at least one of the internal electrodes, and
        a central portion that is a region disposed between two surface portions, and
    a content of the Al compared to the Ni is higher in the central portion than in the surface portion.

2. The multilayer electronic component of claim 1, wherein an area of the oxide including Al is 0.5% or more and 1.0% or less of an area of at least one of the internal electrodes.

3. The multilayer electronic component of claim 2, wherein
    a direction in which the dielectric layer and the internal electrodes are alternately disposed is a first direction, a direction perpendicular to the first direction is a second direction, and a direction perpendicular to the first and second directions is a third direction,
    the area of the oxide including Al and the area of the at least one of the internal electrodes are values measured from cross-sections in the first direction and in the third direction taken in a central portion of the multilayer electronic component in the second direction.

4. The multilayer electronic component of claim 1, wherein the oxide including Al is disposed to be trapped inside at least one of the internal electrodes.

5. The multilayer electronic component of claim 1, wherein the oxide including Al includes $Al_2O_3$.

6. The multilayer electronic component of claim 1, wherein at least one of the internal electrodes further includes ceramic particles including Ba and Ti.

7. The multilayer electronic component of claim 1, wherein at least one of the internal electrodes includes:
    two or more electrode regions including a conductive material, and
    a disconnected region that is a space between the electrode regions, and
    an electrode connectivity is 81% or more, where the electrode connectivity is a ratio of a sum of lengths of the two or more electrode regions to a total length of the at least one of the internal electrodes.

8. The multilayer electronic component of claim 1, wherein an area of the oxide including Al is greater in the central portion than in the surface portion.

9. The multilayer electronic component of claim 1, wherein an average thickness of at least one of the internal electrodes is 0.35 µm or less.

10. The multilayer electronic component of claim 1, wherein an average thickness of the dielectric layer is 0.35 µm or less.

11. The multilayer electronic component of claim 1, wherein
    a direction in which the dielectric layer and the internal electrodes are alternately disposed is a first direction,
    the body includes a capacitance forming portion configured to form capacitance, the capacitance forming portion including the internal electrodes alternately disposed with the dielectric layer, and a cover portion disposed on one surface and the other surface of the capacitance forming portion opposing each other in the first direction, and
    an average thickness of the cover portion is 15 µm or less.

12. The multilayer electronic component of claim 1, wherein
    a direction in which the dielectric layer and the internal electrodes are alternately disposed is a first direction, a direction perpendicular to the first direction is a second direction, and a direction perpendicular to the first and second directions is a third direction,
    the body includes a capacitance forming portion configured to form capacitance, the capacitance forming portion including the internal electrodes alternately disposed with the dielectric layer, and a margin portion disposed on one surface and the other surface of the capacitance forming portion opposing each other in the third direction, the external electrodes are disposed on one surface and the other surface of the body opposing each other in the second direction, and an average width of the margin portion is 15 μm or less.

13. A multilayer electronic component comprising:

a body including a dielectric layer and internal electrodes alternately disposed with the dielectric layer; and external electrodes disposed on the body, wherein the internal electrodes include an oxide including Al, an area of the oxide including Al is 0.5% or more and 1.0% or less of an area of at least one of the internal electrodes, wherein at least one of the internal electrodes includes:

a surface portion that is a region from an interface between the at least one of the internal electrodes and the dielectric layer up to 20 nm inside the at least one of the internal electrodes, and a central portion that is a region disposed between two surface portions, an area of the oxide including Al is greater in the central portion than in the surface portion.

14. The multilayer electronic component of claim 13, wherein the internal electrodes further include Ni.

15. The multilayer electronic component of claim 14, wherein the oxide including Al includes $Al_2O_3$.

16. The multilayer electronic component of claim 15, wherein a content of the Al is 3 at % or more and 5 at % or less compared to a content of the Ni.

17. The multilayer electronic component of claim 14, wherein the internal electrodes further include ceramic particles including Ba and Ti.

* * * * *